United States Patent
Gu et al.

(10) Patent No.: US 12,019,551 B2
(45) Date of Patent: Jun. 25, 2024

(54) TECHNIQUES FOR MULTI-TIERED DATA STORAGE IN MULTI-TENANT CACHING SYSTEMS

(71) Applicant: Visa International Service Association, San Francisco, CA (US)

(72) Inventors: Yu Gu, Austin, TX (US); Hongqin Song, Austin, TX (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 114 days.

(21) Appl. No.: 17/764,879

(22) PCT Filed: Oct. 4, 2019

(86) PCT No.: PCT/US2019/054860
§ 371 (c)(1),
(2) Date: Mar. 29, 2022

(87) PCT Pub. No.: WO2021/066844
PCT Pub. Date: Apr. 8, 2021

(65) Prior Publication Data
US 2022/0342820 A1 Oct. 27, 2022

(51) Int. Cl.
*G06F 12/00* (2006.01)
*G06F 12/0811* (2016.01)
(Continued)

(52) U.S. Cl.
CPC ........ *G06F 12/084* (2013.01); *G06F 12/0811* (2013.01); *G06F 12/0824* (2013.01); *G06F 12/0871* (2013.01); *G06F 2212/283* (2013.01)

(58) Field of Classification Search
CPC ............. G06F 12/084; G06F 2212/283; G06F 2212/1028
See application file for complete search history.

(56) References Cited

U.S. PATENT DOCUMENTS 8,117,418 B1 2/2012 Metcalf et al.
9,852,076 B1 * 12/2017 Garg ..................... G06F 16/172
(Continued)

OTHER PUBLICATIONS

Application No. EP19947834.8, Extended European Search Report, Mailed on Sep. 21, 2022, 13 pages.
(Continued)

*Primary Examiner* — John A Lane
(74) *Attorney, Agent, or Firm* — Kilpatrick Townsend & Stockton LLP

(57) ABSTRACT

Embodiments of the invention are directed to systems and methods for utilizing a multi-tiered caching architecture in a multi-tenant caching system. A portion of the in-memory cache may be allocated as dedicated shares (e.g., dedicated allocations) that are each dedicated to a particular tenant, while another portion of the in-memory cache (e.g., a shared allocation) can be shared by all tenants in the system. When a threshold period of time has elapsed since data stored in a dedicated allocation has last been accessed, the data may be migrated to the shared allocation. If data is accessed from the shared allocation, it may be migrated back to the dedicated allocation Utilizing the techniques for providing a multi-tiered approach to a multi-tenant caching system can increase performance and decrease latency with respect to conventional caching systems.

18 Claims, 7 Drawing Sheets

(51) Int. Cl.
    *G06F 12/0817*     (2016.01)
    *G06F 12/084*     (2016.01)
    *G06F 12/0871*     (2016.01)

(56) References Cited

U.S. PATENT DOCUMENTS

| | | |
|---|---|---|
| 10,664,462 B2 * | 5/2020 | Gurajada .............. G06F 3/0653 |
| 2003/0126365 A1 * | 7/2003 | Jamil .................. G06F 12/0831 |
| | | 711/143 |
| 2003/0204787 A1 | 10/2003 | Bartucca et al. |
| 2013/0138891 A1 * | 5/2013 | Chockler ............ G06F 12/0893 |
| | | 711/E12.022 |
| 2013/0346693 A1 | 12/2013 | Zhang |
| 2014/0012936 A1 * | 1/2014 | Aikoh .................. G06F 12/084 |
| | | 709/213 |
| 2015/0052314 A1 | 2/2015 | Fujii et al. |
| 2015/0095581 A1 | 4/2015 | Stairs et al. |
| 2016/0210044 A1 * | 7/2016 | Mitkar ................. G06F 3/0656 |
| 2016/0342522 A1 * | 11/2016 | Lin .......................... G06F 12/10 |
| 2017/0116135 A1 | 4/2017 | Sundaravaradan et al. |
| 2017/0374151 A1 | 12/2017 | Moorthi et al. |
| 2018/0060238 A1 | 3/2018 | Esser et al. |
| 2018/0165200 A1 | 6/2018 | Sethuraman |
| 2019/0121567 A1 | 4/2019 | Kim et al. |
| 2019/0179755 A1 | 6/2019 | Mudumbai et al. |
| 2021/0157740 A1 * | 5/2021 | Benhanokh ......... G06F 12/0877 |

OTHER PUBLICATIONS

Kim et al., "A Hybrid Cache Architecture for Meeting Per-Tenant Performance Goals in a Private Cloud", Computer Science, arXiv:1906.01260v1, Jun. 4, 2019, 11 pages.
Application No. PCT/US2019/054860, International Search Report and Written Opinion, Mailed on Jul. 2, 2020, 10 pages.

* cited by examiner

TECHNIQUES FOR MULTI-TIERED DATA STORAGE IN MULTI-TENANT CACHING SYSTEMS

CROSS-REFERENCE TO RELATED APPLICATIONS

This application is the U.S. national stage application of PCT/US2019/054860, filed Oct. 4, 2019, the disclosure of which is incorporated herein by reference in its entirety.

BACKGROUND

A variety of systems may utilize large data sets to perform operations. By way of example, a system that processes data transactions may utilize historical transaction data to perform a variety of operations. Some of this data may be cached in local memory of a computing device such that future requests for that data can be performed faster than it would be possible by accessing the data's primary storage location (e.g., typically located in disk storage). Caching allows a system to increase data retrieval performance by reducing the need to access an underlying slower storage layer.

Some in-memory caching systems may be utilized by multiple tenants. Cache management in such systems can be complex. When tenants are provided the ability to store data anywhere in a shared cache, some tenants may utilize more than a fair share of the cache which can increase latency with respect to the other tenant's access operations. However, providing tenants dedicated shares of the cache for fairness reasons can also lead to inefficient utilization of the cache as some tenants may not utilize all of their dedicated memory. Accordingly, conventional in-memory caching systems and the management thereof presents a number of drawbacks and inefficiencies.

Embodiments of this disclosure address these and other problems, individually and collectively.

SUMMARY

One embodiment of the invention is directed to a method. The method may comprise providing, by a computing device, a plurality of dedicated allocations of a cache, each dedicated allocation of the cache corresponding to an entity of a plurality of entities, the cache being provided utilizing random access memory. The method may further comprise providing, by the computing device, a shared allocation of the cache, the shared allocation being available for storage to each of the plurality of entities. The method may further comprise identifying, by the computing device, that a threshold period of time has elapsed since data stored in a dedicated allocation of the cache was last accessed. The method may further comprise migrating, by the computing device, the data from the dedicated allocation of the cache to the shared allocation of the cache.

In some embodiments, the method may further comprise, when the dedicated allocation of the cache is full, determining whether a shared allocation of the cache is full. When the shared allocation of the cache is not full, the method may comprise migrating an oldest instance of data from the dedicated cache associated with the entity to the shared allocation of the cache and storing the data received in the caching request in the dedicated allocation associated with the entity.

In embodiments, the method may further comprise determining a plurality of hit ratios corresponding to each entity of the pluralities of entities, each hit ratio identifying a percentage of caching requests that result in requested data being found in the cache. The method may further comprise adjusting one or more eviction rules of the shared allocation of the cache based at least in part on the plurality of hit ratios.

In some embodiments, the method may further comprise receiving a data request for cached data associated with an entity. The method may further comprise determining whether the cached data is stored the dedicated allocation associated with the entity. The method may further comprise, when the cached data is stored in the dedicated allocation associated with the entity, returning the cached data in response to the data request.

In some embodiments, the method may further comprise, when the cached data is not stored in the dedicated allocation associated with the entity, determining whether the cached data is stored in the shared allocation of the cache. When the cached data is stored in the shared allocation, the method may comprise returning the cached data. When the cached data is not stored in the shared allocation, the method may comprise returning an indication that the cached data was not found.

In some embodiments, the method may further comprise, when the cached data is stored in the shared allocation, determining whether the dedicated allocation associated with the entity is full and migrating the cached data to the dedicated allocation associated with the entity when the dedicated allocation associated with the entity is not full.

In some embodiments, the method may further comprise, when the dedicated allocation associated with the entity is full: determining whether the shared allocation of the cache is full, migrating an oldest instance of data from the dedicated allocation associated with the entity to the shared allocation of the cache when the shared allocation of the cache is not full, and storing the cached data in the dedicated allocation associated with the entity.

In some embodiments, the method may further comprise, when the shared allocation of the cache is full, evicting an amount of data from the shared allocation in accordance with one or more eviction rules. The method may further comprise migrating an oldest instance of data from the dedicated allocation associated with the entity to the shared allocation of the cache when the shared allocation of the cache is not full. The method may further comprise storing the cached data in the dedicated allocation associated with the entity.

In some embodiments, the method may further comprise identifying a hit ratio threshold specifying an amount of data requests that are to result in data being found in the cache, monitoring corresponding hit ratios of data requests submitted by the plurality of entities, and providing a notification to an entity when a hit ratio associated with the entity falls below the hit ratio threshold.

In some embodiments, the stored data of the shared allocation of the cache is evicted based at least in part on one or more eviction rules. In some embodiments, the one or more eviction rules may specify that first data corresponding to an entity with a highest hit ratio of a plurality of hit ratios corresponding to the plurality of entities is to be evicted before second data corresponding to the remaining entities of the plurality of entities.

In some embodiments, the method may further comprise receiving, from another computing device associated with an entity of the plurality of entities, a caching request comprising data to be cached, storing the data in a dedicated allocation corresponding to the entity when the dedicated allocation corresponding to the entity has available space, and storing the data in a shared allocation of the cache when the dedicated allocation corresponding to the entity is full.

In some embodiments, the method may further comprise receiving, from another computing device associated with an entity of the plurality of entities, a data request identifying data to be retrieved, searching for the data in the dedicated allocation corresponding to the entity, and providing the data in a data response when the data is found in the dedicated allocation corresponding to the entity.

In some embodiments, the method may further comprise searching for the data in the shared allocation when the data is not found in the dedicated allocation corresponding to the entity, providing the data in a data response when the data is found in the shared allocation, and providing a notification that the data is not found when the data is not found in the shared allocation.

In some embodiments, the method may further comprise receiving, from another computing device associated with an entity of the plurality of entities, a caching request identifying data to be cached, determining that a dedicated allocation of the cache corresponding to the entity and the shared allocation are full, evicting first data from the shared allocation, migrating second data from the dedicated allocation of the cache corresponding to the entity to the shared allocation, and storing the data to be cached in the dedicated allocation of the cache corresponding to the entity.

In some embodiments, utilizing the plurality of dedicated allocations and the shared allocation may decrease an overall latency associated with of data requests submitted by the plurality of entities. In some embodiments, the plurality of dedicated allocations are equal in size.

In some embodiments, the method may further comprise maintaining a mapping identifying each of the plurality of entities to a particular corresponding dedicated allocation of the cache.

Another embodiment of the invention is directed to a computing device (e.g., a cache management computer) comprising a processor, a cache, and one or more memories storing executable instructions that, when executed by the processor, cause the computing device to perform any of the operations of the method discussed above.

Further details regarding embodiments of the invention can be found in the Detailed Description and the Figures.

DETAILED DESCRIPTION

Figure 1:
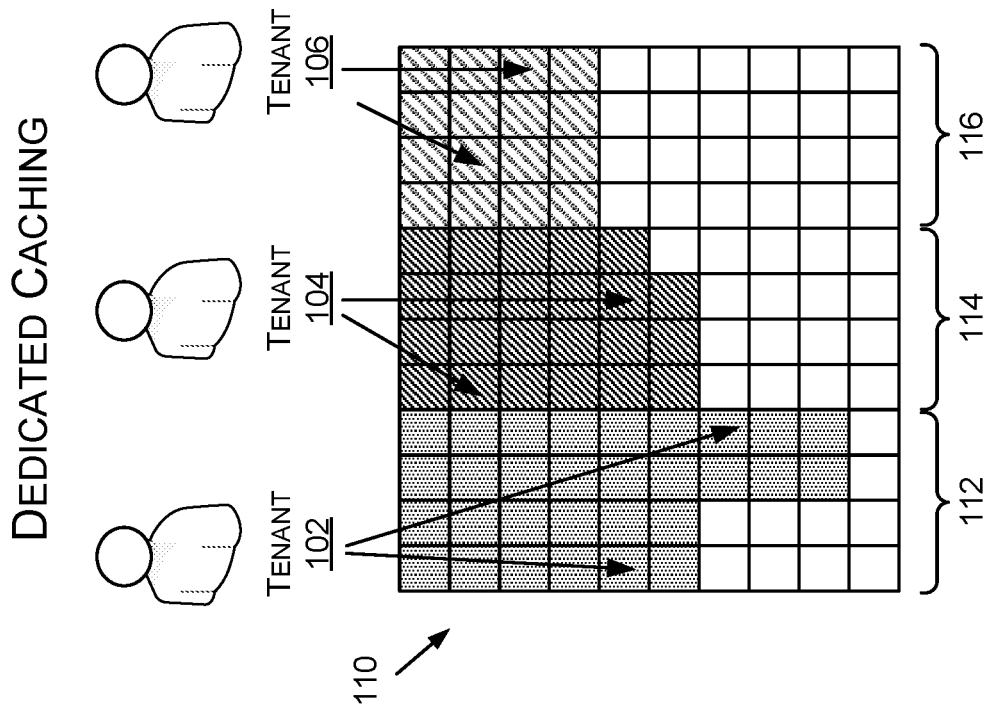
FIG. 1 shows a block diagram depicting two conventional caching techniques utilized in a multi-tenant system.
Figure 1:
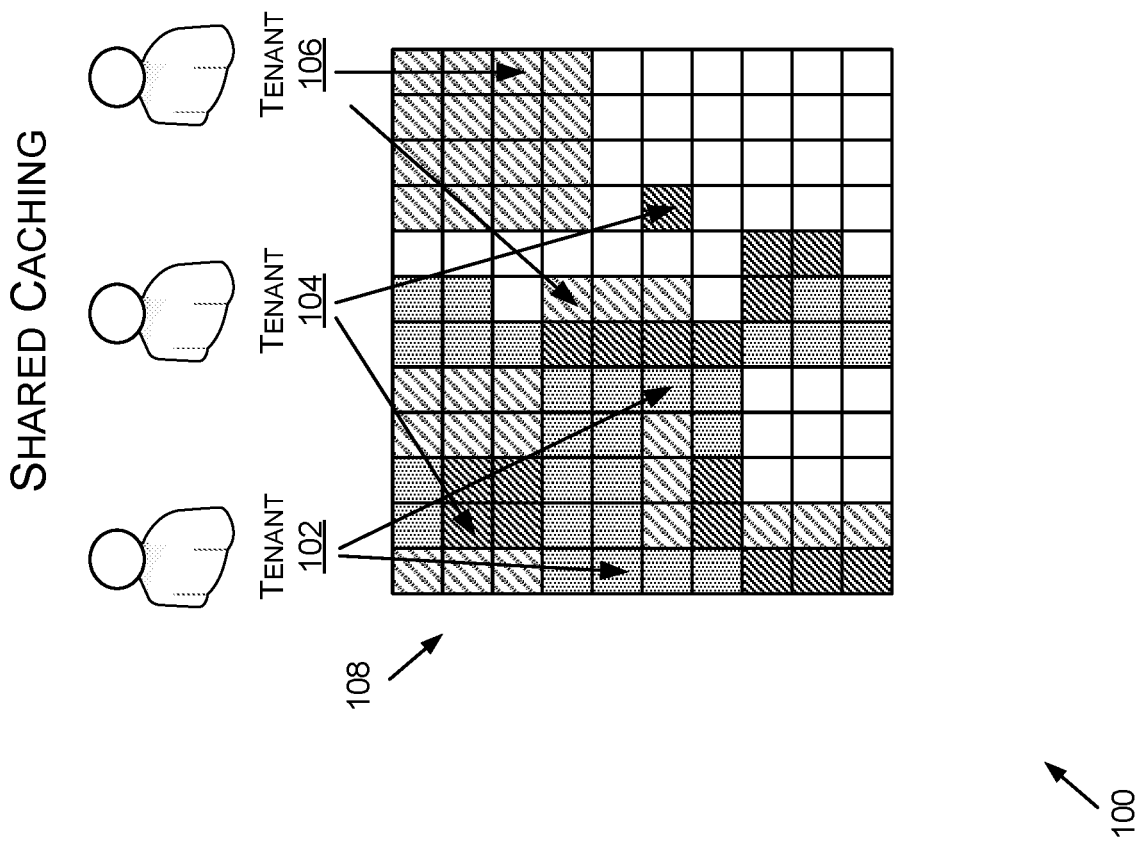

Embodiments of the present invention are directed techniques for providing and utilizing a multi-tiered cache in a multi-tenant caching system. The techniques described herein may be applied to any suitable context in which data is stored and is to be accessed at a future time to perform any suitable operations.

Prior to discussing specific embodiments of the invention, some terms may be described in detail.

A "computing device" may comprise any suitable electronic device that may perform operations. In some embodiments, a computing device may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of computing devices include mobile phones (e.g. cellular phones), PDAs, tablet computers, net books, laptop computers, personal music players, hand-held specialized readers, server computers, etc.

An "entity" may include an individual, an organization, a computing system, a software application or the like. Example entities may include, but are not limited to a merchant, a software application, a data provider, a database provider, a web service, a transit agency, a dwelling operator, an issuer, an acquirer, a financial institution, or the like.

A "tenant" may include an entity that accesses hardware of a system through a software application. A "multi-tenant system" refers to an architecture in which a single instance of software serves multiple tenants. A "multi-tenant caching system" refers to an architecture in which a single instance of software manages caching operations for multiple tenants.

A "cache" may include any suitable local memory (e.g., random access memory (RAM)) that a processor can access. For example, a cache may include RAM that is directly communicatively coupled to a processor such as onboard memory. Cached data can be accessed more quickly by the processor than data stored in a hard drive (e.g., disk memory) or in remote storage such as local memory (e.g., RAM) and/or disk storage of another computer and/or system.

A "shared cache" may include any suitable cache that is shared by two or more entities. For example, two or more tenants may utilize a shared cache in a multi-tenant caching system. A "shared allocation of a cache" may refer to a portion of a larger cache that is allocated and/or configured to be shared by multiple entities.

A "dedicated cache" may include any suitable cache that is dedicated to a particular entity and may be utilized only by that entity. A "dedicated allocation of a cache" may refer to a portion of a larger cache that is allocated and/or configured to be utilized by a single entity and no other.

"Random access memory" is a form of computer memory that can be read and changed in any order. A random-access memory device allows data items to be read or written in almost the same amount of time irrespective of the physical location of data inside the memory.

"Disk memory" refers to storage found in hard disk space. Utilizing disk memory is slower than utilizing random access memory for storage and data retrieval operations.

A "caching request" refers to any suitable data message that indicates a request to cache data. A caching request can be in any suitable format. In some embodiments, a caching request can include the data that is requested to be cached.

A "caching response" refers to any suitable data message that responds to a request to cache data. A caching response can be in any suitable format. In some embodiments, a caching response can include an indication that the data was successfully or unsuccessfully cached.

A "data request" refers to any suitable data message that indicates a request for data. A data request can be in any suitable format. In some embodiments, a data request can include an identifier for the data that is being requested.

A "data response" refers to any suitable data message that responds to a data request. A data response can be in any suitable format. In some embodiments, a data response can include the data requested (or a portion of the data requested) or an indication that the data was not found and/or a reason that the data was not found.

A "hit ratio" refers to a fraction of accesses which are hit (e.g., successful). Said another way, a hit ratio can refer to a number of times requested data is found in cache divided by the total number of data requests for the cache.

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services. A resource provider may operate a computer to perform operations, which can also be generically referred to as a "resource provider computer".

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer. An authorizing entity may operate a computer to perform operations, which can also be generically referred to as an "authorizing entity computer".

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "transaction data" including, by way of example only: a service code, a CVV (card verification value), a dCVV (dynamic card verification value), a PAN (primary account number or "account number"), a payment token, a user name, an expiration date, etc. The authorization request message may include additional "transaction data," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

FIG. 1 shows a block diagram depicting two conventional caching techniques utilized in a multi-tenant system. Conventional multi-tenant systems typically utilize one of two caching techniques. The first technique may be referred to as "shared caching." In a multi-tenant system in which shared caching is employed, a number of tenants (e.g., tenants 102, 104 and 106) may each utilize a shared cache 108. While utilizing the shared cache 108, any of the tenants may utilize any and/or all of the shared cache 108. The data of each tenant may be spread out across the shared cache. If one tenant (e.g., tenant 102) were to greedily store data in the shared cache such that his data disproportionately utilized the cache space with respect to the other tenants, than a hit ratio corresponding to the remaining tenants (e.g., tenants 104 and 106) may be adversely affected. Thus, utilizing shared caching techniques can result in overutilization of the cache by some tenants which can adversely affect the remaining tenants of the cache.

To address these fairness issues, some caching systems utilize "dedicated caching." Dedicated caching may refer to a technique for caching data that utilizes a dedicated cache. By way of example, in a dedicated cache, each tenant (e.g., tenant 102, 104 and 106) may be allocated a different share of the cache. The use of three tenants is intended to be illustrative only. Dedicated cache 110 may be utilized as an example of a dedicated cache. The dedicated cache 110 may have different portions that are allocated/dedicated for use by a particular tenant and no other. By way of example, tenant 102 can be assigned dedicated allocation 112 for data storage. Dedicated allocation 112 can therefore be utilized only by tenant 102 and not by tenants 104 and 106. Similarly, tenant 104 can be assigned dedicated allocation 114 and tenant 106 can be assigned dedicated allocation 116. Dedicated allocation 114 may only be utilized by tenant 104 and dedicated allocation 116 may only be utilized by tenant 106. It should be appreciated that, although the allocations 112-116 are depicted as being equal in size, these allocations could differ in size from one another in some embodiments.

Dedicated caching techniques have some advantages over shared caching techniques in that no tenant could over utilize memory space of the cache. However, dedicated caching techniques present other problems. For example, it may be the case that tenant 102 fills the entirety of dedicated allocation 112, but tenant 106 still has space available in dedicated allocation 116. While tenant 102 requires additional space, none is available. Further, tenant 106 may never fully utilize the dedicated allocation 116 which can result in valuable memory space being wasted which can be especially troubling in light of the storage needs of tenant 102.

Thus, both shared caching and dedicated caching techniques present drawbacks in fairness, latency, and utilization. Embodiments of this disclosure address these and other problems, individually and collectively.

Figure 2:
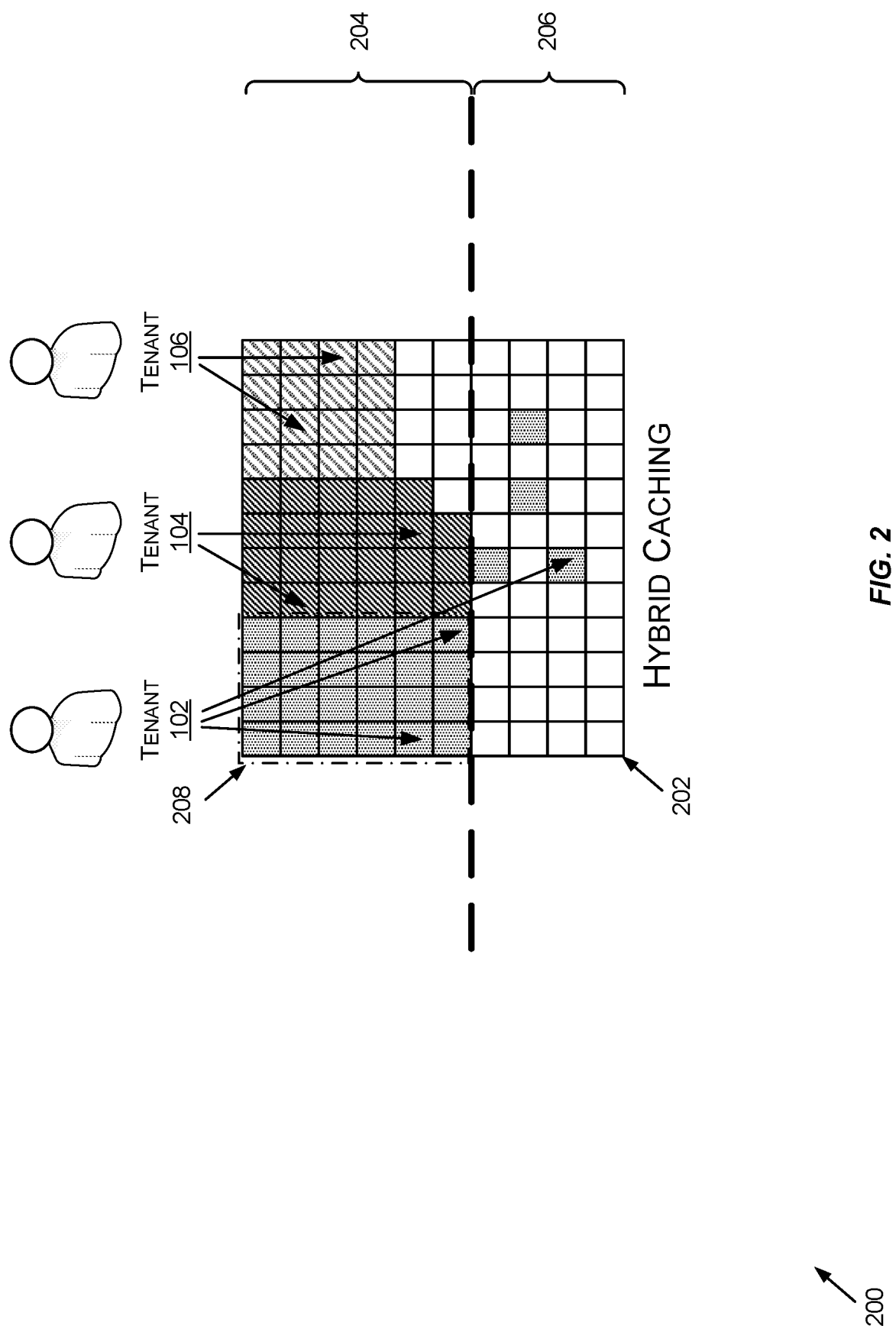
FIG. 2 shows a block diagram depicting a multi-tiered caching technique utilized in a multi-tenant caching system, according to some embodiments.

FIG. 2 shows a block diagram 200 depicting a multi-tiered caching technique utilized in a multi-tenant caching system, according to some embodiments. The techniques discussed in connection with FIG. 2 may be referred to as a "hybrid caching technique." In some embodiments, a hybrid cache 202 may be divided into two portions. A first portion (e.g., dedicated portion 204) may be a dedicated portion of the hybrid cache 202 while a second portion (e.g., shared portion 206) may be utilized as a shared portion of the hybrid cache 202.

Within the dedicated portion 204 of the hybrid cache 202, each tenant (e.g., tenant 102-106) may be allocated a corresponding portion that is dedicated for their use and no others. By way of example, tenant 102 may be assigned dedicated allocation 208 such that dedicated allocation 208 may be utilized by tenant 102 and not by tenants 104 or 106. Tenants 104 and 106 may each be assigned a corresponding allocations of the dedicated portion 204 of the hybrid cache 202 that may be dedicated for their respective use. Although FIG. 2 depicts the dedicated allocations of tenants 102-106 as being equal, it should be appreciated that in some embodiments, the size of the dedicated allocations may differ between tenants. At should be appreciated that any suitable number of tenants may be utilized and the hybrid cache 202 may be of any suitable size.

Hybrid cache 202 may additionally include shared portion 206. Shared portion 206 may be utilized by any tenant of the system (e.g., tenants 102-106). In some embodiments, the shared portion 206 may not be utilized by a tenant until the whole of its dedicated allocation of the cache has been filled.

As depicted in FIG. 2, the dedicated portion 204 may include 60% of the overall cache 202 while the shared portion 206 utilizes 40% of the hybrid cache 202. It should be appreciated that this ratio is utilized for illustrative purposes only and the ratio of dedicated to shared space may be differently proportioned. For example, in some embodiments, the dedicated portion 204 may utilize 80% of the hybrid cache 202 while the shared portion 206 utilizes the remaining 20% of the hybrid cache 202. The specific size of the dedicated portion 204 and shared portion 206 may be user configurable (e.g., by an administrator of a multi-tenant caching system that includes hybrid cache 202) and/or the specific size of the dedicated portion 204 and shared portion 206 may be dynamically updated by the system based on usage patterns of the tenants 102-106.

Figure 3:
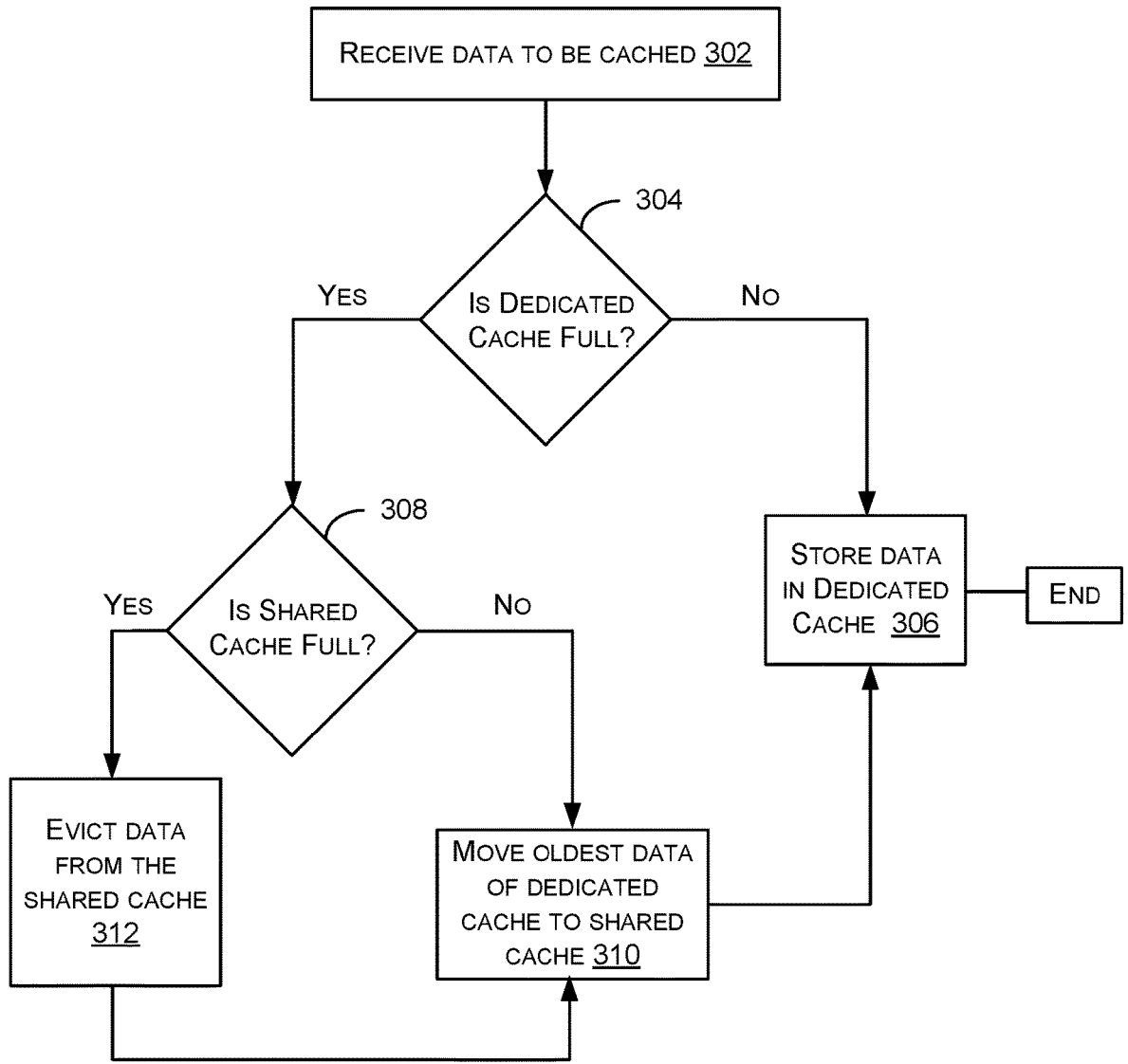
FIG. 3 shows a block diagram illustrating a method for caching data utilizing a multi-tiered cache in a multi-tenant caching system, according to some embodiments.

FIG. 3 shows a block diagram illustrating a method 300 for caching data utilizing a multi-tiered cache in a multi-tenant caching system, according to some embodiments. The method 300 may be performed in any suitable order. More or fewer operations may be performed within the method 300. The method 300 may be performed by a computing device such as a cache management computer. An example cache management computer is provided below in connection with FIG. 5.

The method 300 may begin at 302, where data to be cached may be received. In some embodiments, the data may be received in a caching request. A caching request may be any suitable message in any suitable form that indicates a request to store data in the cache (e.g., the hybrid cache 202 of FIG. 2). In some embodiments, the caching request may include an identifier of the requestor (e.g., an identifier indicating a particular tenant such as tenant 102 of FIG. 2) and the data to be cached (or a location where the data to be cached currently resides).

At 304, it may be determined whether the dedicated cache allocated to the requestor (e.g., the dedicated allocation 208 corresponding to the tenant 102 of FIG. 2) is full. If the dedicated cache is not full, the method may proceed to 306 where the data may be stored in the dedicated cache and the method 300 may end.

Alternatively, if the dedicated cache allocated to the requestor is full, the method may proceed to 308 where a determination made be made as to whether or not the shared cache (e.g., the shared portion 206 of the hybrid cache 202 of FIG. 2) is full. If the shared cache is not full, the method may proceed to 310.

At 310, data having the oldest last accessed timestamp may be identified in the dedicated cache corresponding to the tenant and this data may be moved to the shared cache. In some embodiments, data stored in the cache may be associated with a timestamp indicating a day and/or time at which the data was last accessed and/or stored. This may referred to as a "last accessed timestamp."

Alternatively, if the shared cache is determined to be full at 308, the method may proceed to 312 where data may be evicted from the shared cache. In some embodiments, one or more eviction rules may be utilized to identify particular data to evict from the shared cache. In some embodiments, the eviction rules may specify that data having the oldest last accessed timestamp is to be evicted first. As another example, the eviction rules may specify that data of a tenant that currently enjoys the highest hit ratio (e.g., indicating that the data that the tenant requests is found in the cache more often than data requested by other tenants) may be evicted first before data of tenants with lower hit ratios. As yet another example, the eviction rules of the shared cache may specify that data having the oldest last accessed timestamp of the tenant with the highest hit ratio is to be evicted from the shared cache first. In some embodiments, all of the data of the tenant with the highest hit ratio may be required to be evicted before data of a tenant with a lower hit ratio is considered for eviction. As yet another example, tenants may be associated with a priority such that data corresponding to a tenant with a lower priority may be evicted before data of a tenant having a higher priority is evicted. The particular eviction rules may be numerous and vary according to the context in which the cache is utilized.

Once the data has been evicted at 312, the method may proceed to 310 where the data having the oldest last accessed timestamp may be identified in the dedicated cache corresponding to the tenant, and this data may be moved to the shared cache. Once the oldest data of the dedicated cache is move to the shared cache, the method may proceed to 306 where the data received at 302 may be stored in the dedicated cache corresponding to the requestor and the method 300 may end.

Figure 4:
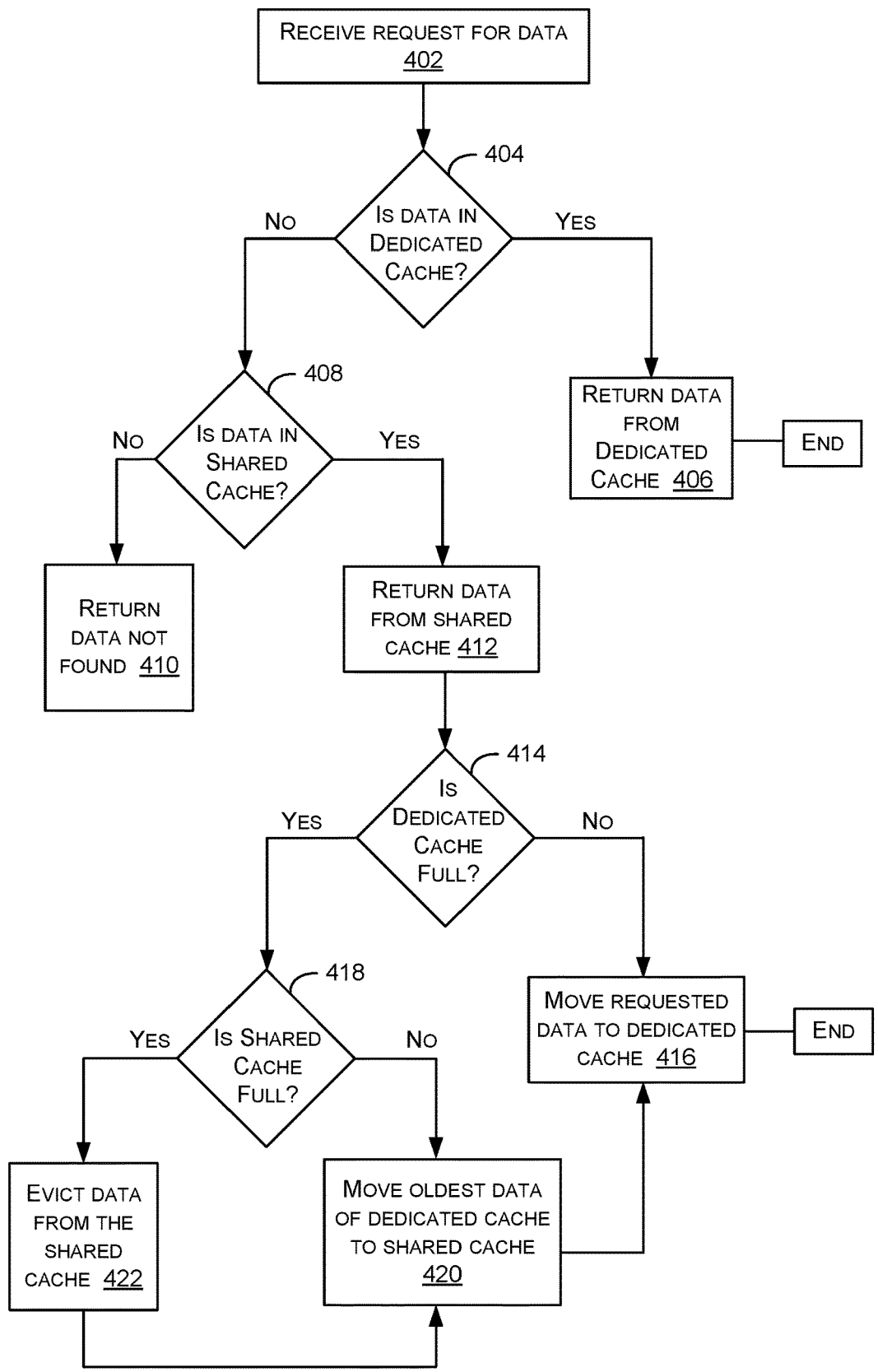
FIG. 4 shows a block diagram illustrating a method for retrieving data utilizing a multi-tiered cache of a multi-tenant caching system, according to some embodiments.

FIG. 4 shows a block diagram illustrating a method for retrieving data utilizing a multi-tiered cache of a multi-tenant caching system, according to some embodiments. The method 400 may be performed in any suitable order. More or fewer operations may be performed within the method 400. The method 400 may be performed by a computing device such as a cache management computer. An example cache management computer is provided below in connection with FIG. 4.

The method 400 may begin at 402, where a request for data may be received. In some embodiments, the request may be received in a data request. A data request may be any suitable message in any suitable form that indicates a request to retrieve data from the cache (e.g., the hybrid cache 202 of FIG. 2). In some embodiments, the data request may include an identifier of the requestor (e.g., an identifier indicating a particular tenant such as tenant 102 of FIG. 2) and an identifier of the data requested.

At 404, it may be determined whether the data requested is located in the dedicated cache allocated to the requestor (e.g., the dedicated allocation 208 corresponding to the tenant 102 of FIG. 2). If the data is located in the dedicated cache, the method may proceed to 406 where the data may be returned in response to the data request and the method 400 may end. In some embodiments, the data may be returned in one or more data responses which can be any suitable message in any suitable form and/or size that may be utilized to respond to a data request.

Alternatively, if the data requested is not located in the dedicated cache corresponding to the requestor, the method may proceed to 408, where it may be determined whether the data requested is located in the shared cache (e.g., the shared portion 206 of FIG. 2). If the data is not found in the shared cache, the method may proceed to 410 where a data response may be returned that indicates that the data was not found.

Alternatively, if the data requested is determined to be located in the shared cache, the method may proceed to 412, where the data may be returned from the shared cache (e.g., via one or more data responses).

Once the data is returned from the shared cache, the method may proceed to 414 where it may be determined whether the dedicated cache corresponding to the requestor is full. If the dedicated cache corresponding to the requestor is not full, the requested data may be moved from the shared cache (e.g., the shared portion 206) to the dedicate cache (e.g., the dedicated allocation 208 corresponding to the tenant 102 who is the data requestor in this example) and the method 400 may end.

Alternatively, if it is determined at 414 that the dedicated cache corresponding to the requestor is full, then the method may proceed to 418 where it may be determined whether the share cache (e.g., the shared portion 206) is full. If the shared cache is not full, then the method may proceed to 420, where data having the oldest last accessed timestamp may be identified in the dedicated cache corresponding to the requestor and this data may be moved to the shared cache. In some embodiments, data stored in the cache may be associated with a timestamp indicating a day and/or time at which the data was last accessed and/or stored. This may referred to as a "last accessed timestamp."

Alternatively, if the shared cache is determined to be full at 418, the method may proceed to 422 where data may be evicted from the shared cache. As discussed above in connection with FIG. 3, one or more eviction rules may be utilized to identify particular data to evict from the shared cache. In some embodiments, the eviction rules may specify that data having the oldest last accessed timestamp is to be evicted first. As another example, the eviction rules may specify that data of a tenant that currently enjoys the highest hit ratio (e.g., indicating that the data that the tenant requests is found in the cache more often than data requested by other tenants) may be evicted first before data of tenants with lower hit ratios. As yet another example, the eviction rules of the shared cache may specify that data having the oldest last accessed timestamp of the tenant with the highest hit ratio is to be evicted from the shared cache first. In some embodiments, all of the data of the tenant with the highest hit ratio may be required to be evicted before data of a tenant with a lower hit ratio is considered for eviction. The particular eviction rules may be numerous and vary according to the context in which the cache is utilized.

Once the data has been evicted at 422, the method may proceed to 420 where the data having the oldest last accessed timestamp may be identified in the dedicated cache corresponding to the tenant, and this data may be moved to the shared cache. Once the oldest data of the dedicated cache is move to the shared cache, the method may proceed to 416 where the data requested at 402 may be stored in the dedicated cache corresponding to the requestor and the method 400 may end.

Figure 5:
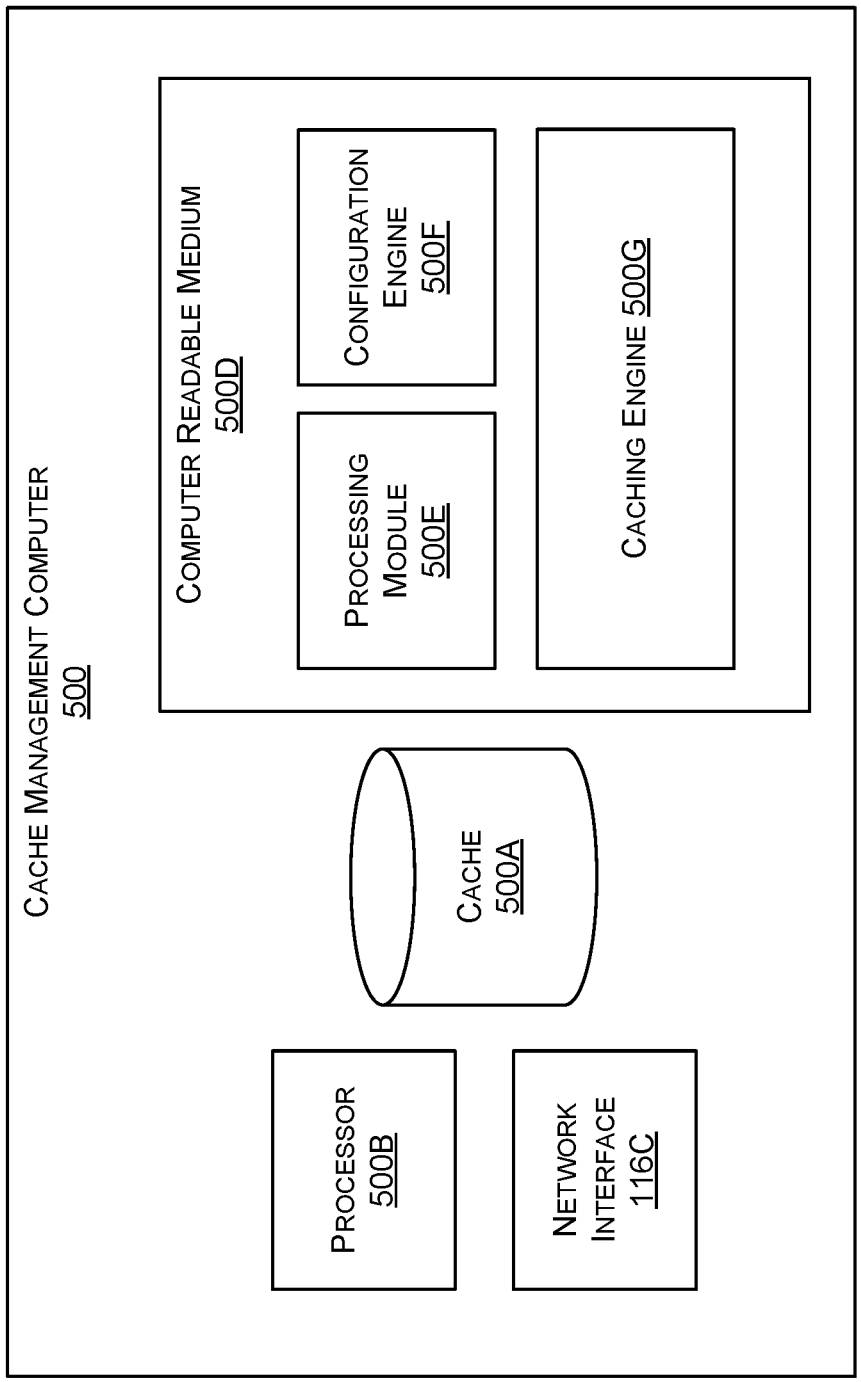
FIG. 5 shows a block diagram of an exemplary cache management computer, according to some embodiments.

FIG. 5 shows a block diagram of an exemplary cache management computer 500, according to some embodiments. The cache management computer 500 may comprise the cache 500A, a processor 500B, a network interface 500C, and a computer readable medium 500D. The cache 500A may be an example of the hybrid cache 202 of FIG. 2. The cache 500A may include random access memory of any suitable size.

The computer readable medium 500D may comprise a number of components such as a processing module 500E, a configuration engine 500F, and a caching engine 500G. More or fewer components are contemplated. It should also be appreciated that the components depicted in FIG. 5 may be combined to perform the functionality described herein. The computer readable medium 500D may also comprise code, executable by the processor 500B for implementing the methods discussed herein.

The processing module 500E may comprise code that, when executed, causes the processor 500B to caching requests from any suitable source. By way of example, the processing module 500E may be configured to cause the processor 500B to receive caching request from a computing device associated with a tenant (e.g., the tenant 102, 104, or 106 of FIG. 2). In some embodiments, the processing module 500E may be configured to cause the processor 500B to provide information received in the caching request to the caching engine 500G. By way of example, the data to be cached may be included in the caching request or a location at which the data to be cached is located may be included in the caching request. The processing module 500E may be further configured to retrieve the data to be cached from the location specified if need be. The processing module 500E may be further configured to transmit the data to be cached to the caching engine 500G. In some embodiments, the caching engine 500G may provide a response to the processing module 500E that indicates the data was successfully cached or not. The processing module 500E may transmit (e.g., to the requesting computing device) a caching response (e.g., a message of any suitable format and/or size) that provides an indication that the data was successfully or unsuccessfully cached.

The processing module 500E may comprise code that, when executed, causes the processor 500B to receive data requests from any suitable source. The data request may be in any suitable form and may include an indication of the data requested. By way of example, the processing module 500E may be configured to cause the processor 500B to receive data request from a computing device associated with a tenant (e.g., the tenant 102, 104, or 106 of FIG. 2). In some embodiments, the processing module 500E may be configured to cause the processor 500B to provide information received in the data request to the caching engine 500G. By way of example, an identifier indicating the data to be retrieved may be provided to the caching engine 500G. In some embodiments, the processing module 500E may receive the data from the caching engine 500G indicating that retrieval was successful or the processing module 500E may receive data indicating that the data was not found. The processing module 500E may transmit (e.g., to the requesting computing device) a data response (e.g., a message of any suitable format and/or size) that provides either the data retrieved or an indication that the data was not found.

The configuration engine 500F may comprise code that, when executed, causes the processor 500B to perform any suitable operations including providing one or more interfaces with which the cache 500A (e.g., an example of the hybrid cache 202 of FIG. 2) may be configured. In some embodiments, the configuration engine 500F may cause the processor 500B to receive user input from these interfaces. The user input may be utilized to configure a number and/or size of one or more dedicated allocations and/or a shared allocation of the cache 500A. The configuration engine 500F may cause the processor 500B to maintain a mapping that indicates an association between specific dedicated allocations of the cache 500A and corresponding tenants. By way of example, an identifier for the dedicated allocation 208 of FIG. 2 may be mapped to an identifier for the tenant 102 of FIG. 2 to indicate that the dedicated allocation 208 is to be utilized by the tenant 102 (e.g., by computing devices associated with the tenant 102) and no other.

In some embodiments, the configuration engine 500F may cause the processor 500B to receive user input indicating one or more eviction rules to be utilized for the cache 500A. In some embodiments, the eviction rules may correspond to one or more dedicated portions of the cache 500A and/or a share portion of the cache 500A. The configuration engine 500F may be configured to cause the processor 500B to store the eviction rules for subsequent use (e.g., by the caching engine 500G).

In some embodiments, the configuration engine 500F may cause the processor 500B to receive user input indicating a priority corresponding to a given tenant. The priority may be utilized by the caching engine 500G when making determinations as to what data is to be evicted from a dedicated allocation and/or a shared allocation of the cache 500A. In some embodiments, the configuration engine 500F may store a priority associated with the tenant as part of the mapping maintained by the configuration engine 500F.

The caching engine 500G may comprise code that, when executed, causes the processor 500B to perform any suitable operations related to caching data and/or retrieving previously cached data. In some embodiments, the caching engine 500G may cause the processor 500B to receive caching requests (e.g., from the processing module 500E). With respect to receiving caching requests, the caching engine 500G may cause the processor 500B to perform the method 300 discussed above in connection with FIG. 3. In some embodiments, the caching engine 500G may be configured to cause the processor 500B to provide a caching response indicating that the requested data was successfully or unsuccessfully cached. In some embodiments, the caching response may be provided to the processing module 500E which in turn can transmit the caching response to the requesting computing device. With respect to receiving data requests, the caching engine 500G may cause the processor 500B to perform the method 400 discussed above in connection with FIG. 4. In some embodiments, the caching engine 500G may be configured to cause the processor 500B to provide a data response including the data requested (or a portion of the data requested) or an indication that the data was not found (or not retrieved for some particular reason). In some embodiments, the caching response may be provided to the processing module 500E which in turn can transmit the caching response to the requesting computing device. The caching engine 500G may utilize the mapping maintained by the configuration engine 500F to identify a dedicated allocation corresponding to the requestor in order to attempt storage and/or retrieval to/from the dedicated allocation before performing operations associated with the share allocation of the cache 500A.

Figure 6:
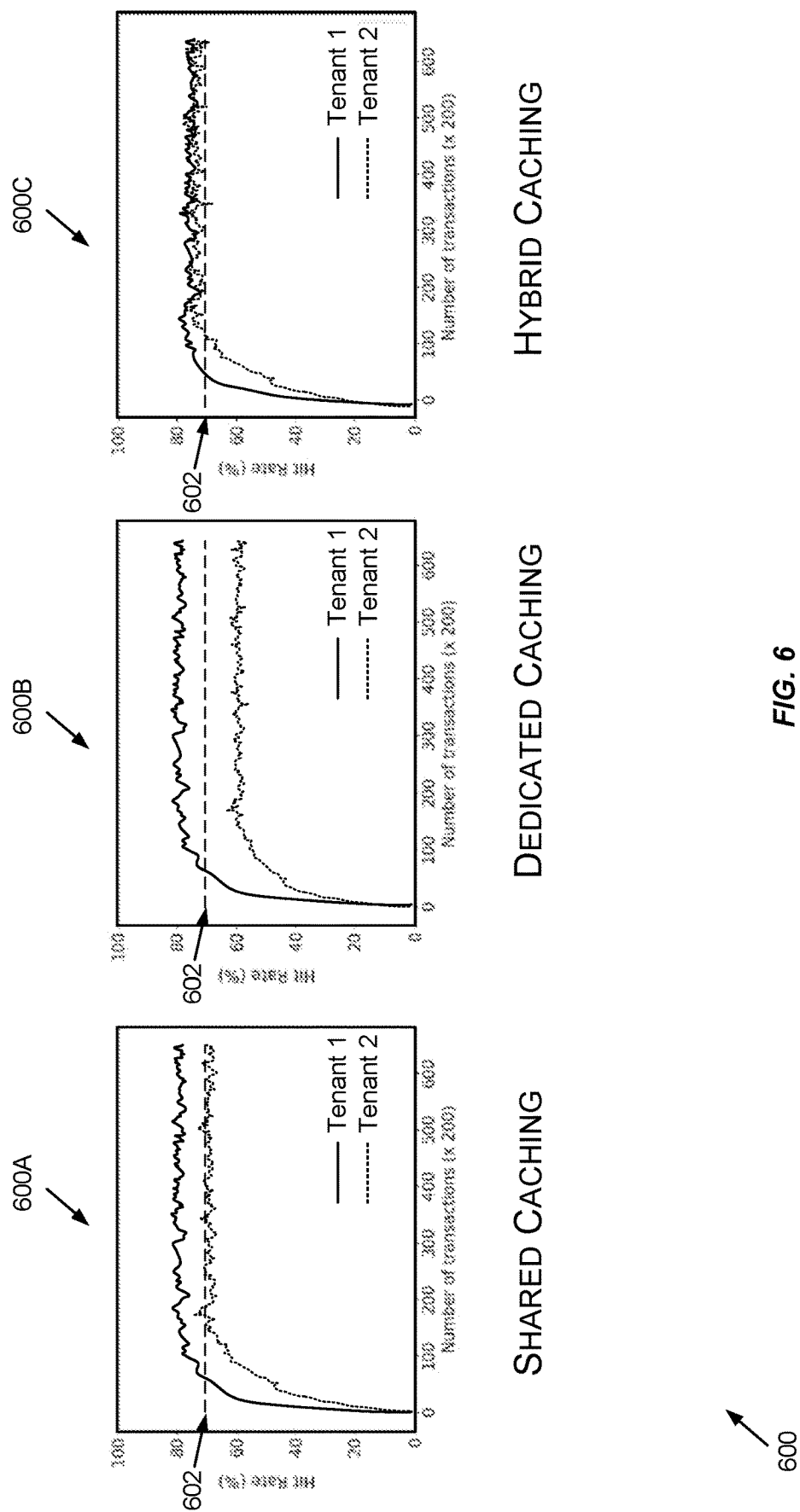
FIG. 6 shows a number of graphs depicting performance enhancements realized by utilizing the multi-tiered caching techniques described herein.

FIG. 6 shows a number of graphs depicting performance enhancements realized by utilizing the multi-tiered caching techniques described herein. Graph 600A depicts the respective hit ratios of two tenants utilizing a shared cache where tenant 1 is greedily storing more data within the cache than tenant 2. As a result, tenant 1 may enjoy a hit ratio of approximately 80% while tenant 2 is disadvantaged with a hit ratio of around 70%. Performance line 602 is intended to depict a performance threshold that indicates a minimum hit ratio that is to be realized by every tenant in the multi-tenant system. As depicted in graph 600A, utilizing a shared caching technique may cause tenant 2 to fail to meet the performance threshold, while tenant 1 exceeds the performance threshold.

Graph 600B depicts the respective hit ratios of two tenants utilizing corresponding dedicated portions of a cache. Even if the dedicated allocations of the cache are equal in size, the tenants can have differing workloads. The graph 600B depicts a situation in which 1 GB of dedicated cache is allocated to each tenant. However, tenant 1 may consistently attempt to store 1.2 GB of data, while tenant 2 consistently attempts to store 1.7 GB of data within their respective dedicated portions of the cache. Because tenant 2's data greatly exceeds the dedicated space, tenant 2 enjoys a much lower hit ratio than that of tenant 1. Again, given this scenario, tenant 2 may fail to meet the performance threshold (as indicated by performance line 602), while tenant 1 exceeds the performance threshold.

Graph 600C is intended to depict the respective hit ratios of two tenants utilizing the hybrid cache 202 of FIG. 2 and the hybrid caching techniques discussed herein. In this scenario, each tenant may have equal dedicated allocations of the cache. Each tenant may utilize their respective dedicated allocations of the cache as well as any suitable portion of the shared allocation of the cache. By utilizing dedicated allocations, fairness is more successfully ensured such that tenant 2's hit ratio is not so dramatically affected by the operations performed by tenant 1 and vice versa. However, when data operations spike and one or more tenants require additional space, the shared allocation fulfills that need allowing both tenants to enjoy increased hit ratios and meet the performance threshold. It is assumed that the cache corresponding to graphs 600A, 600B, and 600C are equal in size.

Figure 7:
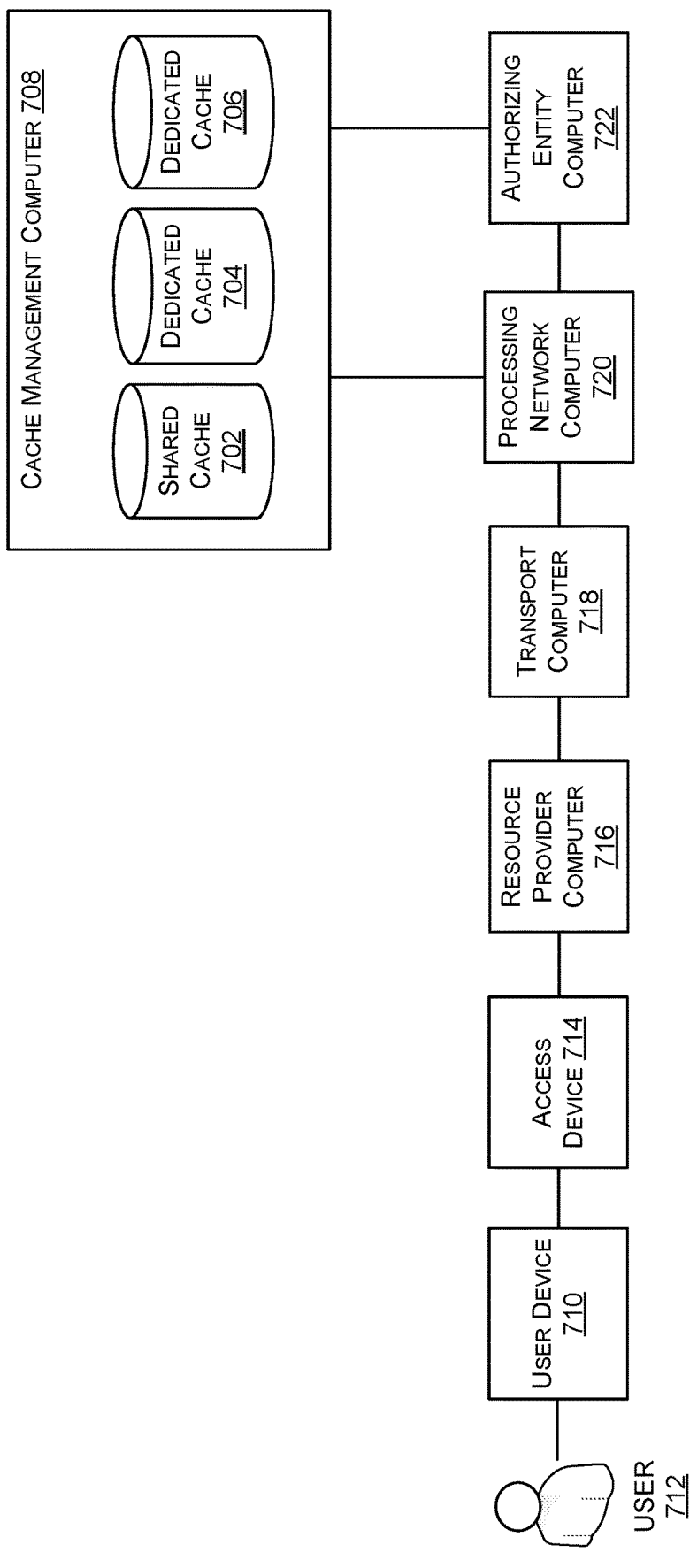
FIG. 7 shows a block diagram of a system for utilizing a multi-tiered cache for multiple tenants, according to some embodiments.

FIG. 7 shows a block diagram of a system 700 for performing a transaction utilizing a multi-tiered cache. Shared cache 702, dedicated cache 704 and dedicated cache 706 may collectively be an example of the hybrid cache 202 of FIG. 2. Shared cache 702, dedicated cache 704, and dedicated cache 706 may collectively be referred to as "the hybrid cache." The hybrid cache may be managed by the cache management computer 708, an example of the cache management computer 500 of FIG. 5. The cache management computer 708 may be utilized to configured the hybrid cache such that the dedicated cache 704 may be associated with a processing network and the dedicated cache 706 may be associated with an authorizing entity. An exemplary processing network may include VisaNet™. Processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

In some embodiments, the processing network may perform fraud detection processing. In some embodiments, fraud detection may utilize one or more machine-learning algorithms. The authorizing entity may be responsible for authorization services and such services may also utilize one or more machine-learning algorithms. In some embodiments, the processing network computer 720 (operated by or on behalf of the processing network) and the authorizing entity computer 722 may be tenants of the hybrid cache. Processing network computer 720 may be provided access to the dedicated cache 704 and the shared cache 702 while the authorizing entity computer 722 may be provided access to the dedicated cache 706 and the shared cache 702. The process network computer 720 and the authorizing entity computer 722 may store any suitable data corresponding to fraud detection or authorization services in the hybrid cache, respectively.

The system 700 may comprise any suitable number of components. As depicted, the system 700 may comprise a user device 710 which may be associated with a user 712, an access device 714, a resource provider computer 716, a transport computer 718, the processing network computer 720, the authorizing entity computer 722, and the cache management computer 708. For simplicity of illustration, a certain number of components are shown in FIG. 7. However, it should be appreciated that embodiments of the invention may include more than one of each component. In addition, some embodiments of the invention may include fewer than or greater than all of the components shown in FIG. 7. In addition, the components in FIG. 7 may communicate via any suitable communication medium using any suitable communications protocol.

The user device 710, the access device 714, the resource provider computer 716, the transport computer 718, the processing network computer 720, the authorizing entity computer 722, and the cache management computer 708 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The user 712 may be able to use the user device 710 to conduct a transaction. In some embodiments, user device 710 may include circuitry that is used to enable certain device functions, such as telephony. The functional elements responsible for enabling those functions may include a processor that can execute instructions that implement the functions and operations of the device. The user device 710 may access the local memory (or another suitable data storage region or element) to retrieve instructions or data used in executing the instructions. The user device 710 may include data input/output elements, such as a keyboard or touchscreen that may be used to enable a user to operate the user device 710 and to input data. Data input/output elements may also be configured to output data via a speaker and/or display of the user device 710. The user device 710 may further utilize a communications element may be used to enable data transfer between user device 710 and a wired or wireless network to assist in connectivity to the Internet or other network, and enabling data transfer functions.

In some embodiments, user device 710 may also include a contactless element interface to enable data transfer between contactless element (not shown) and other elements of the device, where contactless element may include a secure memory and a near field communications data transfer element (or another form of short range communications technology). A cellular phone or similar device is an example of a user device 710 that may be used in accordance with embodiments of the present invention. However, other forms or types of devices may be used without departing from the underlying concepts of the invention. For example, the user device 710 may alternatively be in the form of a payment card, a key fob, a PDA, a tablet computer, a net book, a laptop computer, a smart watch, or the like.

Access device 714 may include any suitable computational apparatus operated by a resource provider (e.g., a merchant). The access device 714 may include a processor and a computer readable medium coupled to the processor, the computer readable medium comprising code, executable by the processor for performing the functionality described herein. In some embodiments, the access device 714 may be used for communicating with the user device 710, the resource provider computer 716, the processing network computer, or any other suitable device and/or system. In some embodiments, the access device 714 may be in any suitable form and may generally be located in any suitable location, such as at the location of a resource provider (e.g., a merchant). Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. The access device 714 may use any suitable contact or contactless mode of operation to send or receive data from, or associated with, the user device 710. In some embodiments, the access device 714 may comprise a POS terminal and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

Resource provider computer 716 may include any suitable computational apparatus operated by, or on behalf of, a resource provider (e.g., a merchant). The resource provider computer 716 may include a processor and a computer readable medium coupled to the processor, the computer readable medium comprising code, executable by the processor for performing the functionality described herein. In some embodiments, the resource provider computer 716 may include a web server computer that may host one or more websites associated with the resource provider. In some embodiments, the resource provider computer 716 may be configured to send/receive data (e.g., an authorization request message, an authorization response message, etc.) to/from the transport computer 718, the access device 714, or any suitable component of the system.

The resource provider computer 716 may be configured to engage in transactions, sell goods or services, or provide access to goods or services to the user 712. The resource provider may accept various forms of payment (e.g. a payment card represented as the user device 710) and may use multiple tools to conduct different types of transactions. For example, the resource provider may operate a physical store and use the access device 714 for in-person transactions. The resource provider may also sell goods and/or services via a website, and may accept payments (e.g., via the user device 710) over the Internet.

Transport computer 718 may be associated with a business entity (e.g., a commercial bank) that has a business relationship with a particular resource provider (e.g., a merchant) or other entity and that may be involved in the process of transaction. The transport computer 718 may issue and manage accounts for resource providers and exchange funds with the authorizing entity computer 722 on behalf of the resource provider. Some entities can perform both transport computer 718 and authorizing entity computer 722 functions. Embodiments of the present invention encompass such single entity transport/authorizing entity computers. In some embodiments, transport computer 718 may be configured to send/receive data to/from cache management computer 500. (e.g., a TAC received in an authorization request message or another message).

The processing network computer 720 may be configured to process transaction between the user 712 (e.g., utilizing the user device 710) and the resource provider associated with the resource provider computer 716. In some examples, the processing network computer 720 may be configured to conduct a settlement process between the transport computer 718 associated with an acquirer (e.g., a financial institution associated with the resource provider) and an authorizing entity computer 722 associated with an authorizing entity (e.g., a financial institution associated with the user 712).

As shown in FIG. 7, the processing network computer 720 may be disposed between the transport computer 718 and the authorizing entity computer 722. The processing network computer 720, as part of its processing, may store any suitable data in the hybrid cache managed by the cache management computer 708. By way of example, the processing network computer 720 may store any suitable number of historical transactions associated with one or more users (e.g., including the user 712) with which fraud detection operations may be performed. In some embodiments, the data utilized by the processing network computer 720 may be stored at and/or retrieved from the dedicated cache 704 and/or the shared cache 702. The cache management computer 708 may manage the caching requests and/or data requests received from the processing network computer 720 and may in turn provide caching responses and/or data responses in response to those requests.

Authorizing entity computer 722 is typically associated with a business entity (e.g., a bank) which issues and maintains user accounts for a user (e.g., the user 725). The authorizing entity may issue payment devices for a user account (e.g., a consumer account), including credit cards and debit cards, and/or may provide user accounts stored and accessible via the user device 710. In some embodiments, the authorizing entity computer 722, as part of its processing, may store any suitable data in the hybrid cache managed by the cache management computer 708. By way of example, the authorizing entity computer 722 may store any suitable data associated with one or more users (e.g., including the user 712) with which operations for providing authorization services may be performed. In some embodiments, the data utilized by the authorizing entity computer 722 may be stored at and/or retrieved from the dedicated cache 706 and/or the shared cache 702. The cache management computer 708 may manage the caching requests and/or data requests received from the authorizing entity computer 722 and may in turn provide caching responses and/or data responses in response to those requests.

As part of a transaction, the user device 710 may be presented at an access device 714 during initiation of the transaction. Account data and/or terminal data may be exchanged between the two and some portion of this data may be transmitted to the resource provider computer 716. The resource provider computer 716 may be configured to generate an authorization request message and transmit the message to the processing network computer 720 via the transport computer 718. The processing network computer 720 may be configured to perform any suitable fraud detection processing utilizing data maintained in the hybrid cache. Based on the outcome of the fraud detection processing, the processing network computer 720 may transmit the authorization request message to the authorizing entity computer 722. The authorizing entity computer 722 may perform any suitable authorization services processing utilizing any suitable data previously stored in the hybrid cache by the authorizing entity computer 722. The authorizing entity computer 722 may determine that the authorization request is to be granted or denied and may generate an authorization response message. The authorization response message may be transmitted to the resource provider computer 716 via the processing network computer 720 and the transport computer 718. The resource provider computer 716 may forward the authorization response message to the access device 714 which may present an indication that the authorization request was granted or denied. At a later time a clearing and settlement process may be performed to settle amounts owed between the acquirer associated with the transport computer and the issuer associated with the authorizing entity computer 722.

TECHNICAL ADVANTAGES

Embodiments of the invention have a number of advantages. For example, utilizing the techniques discussed above, dedicated allocations of a cache may be utilized to ensure that each tenant of a multi-tenant system is afforded some portion of the cache as dedicated space. This can ensure that the effects of greedy tenants is mitigated such that the performance of other tenant's caching and/or data requests is not as adversely affected as they would be in conventional systems. Additionally, because the hybrid caching techniques described herein also utilize a shared cache, the chances of underutilization of the cache may also be reduced. By utilizing this multi-tiered architecture, the hit ratios and overall performance of the hybrid cache can be improved over conventional caching systems.

Any of the computing devices described herein may be an example of a computer system that may be used to implement any of the entities or components described above. The subsystems of such a computer system may be are interconnected via a system bus. Additional subsystems include a printer, keyboard, storage device, and monitor, which is coupled to display adapter. Peripherals and input/output (I/O) devices, which couple to I/O controller, can be connected to the computer system by any number of means known in the art, such as a serial port. For example, I/O port or external interface can be used to connect the computer apparatus to a wide area network such as the Internet, a mouse input device, or a scanner. The interconnection via system bus may allow the central processor to communicate with each subsystem and to control the execution of instructions from system memory or the storage device, as well as the exchange of information between subsystems. The system memory and/or the storage device may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A computer-implemented method, comprising:
providing, by a computing device, a plurality of dedicated allocations of a cache, a dedicated allocation of the plurality of dedicated allocations being associated with an entity of a plurality of entities, the cache being provided utilizing random access memory;
providing, by the computing device, a shared allocation of the cache, the shared allocation being available for storage to each of the plurality of entities;
receiving, by the computing device from another computing device associated with the entity, a caching request comprising data to be cached; and
when the shared allocation of the cache is full:
evicting, by the computing device, an amount of data from the shared allocation of the cache based on identifying the amount of data as being oldest in the shared allocation of the cache;
migrating, by the computing device, an oldest instance of data from the dedicated allocation associated with the entity to the shared allocation of the cache; and
storing, by the computing device, the data received in the caching request in the dedicated allocation associated with the entity.

2. The computer-implemented method of claim 1, further comprising:
determining whether a dedicated allocation of the cache is full, the dedicated allocation being associated with the entity; and
when the dedicated allocation of the cache is not full, storing the data received in the caching request in the dedicated allocation associated with the entity.

3. The computer-implemented method of claim 2, further comprising:
when the dedicated allocation of the cache is full:
determining whether the shared allocation of the cache is full;
when the shared allocation of the cache is not full, migrating an oldest instance of data from the dedicated allocation associated with the entity to the shared allocation of the cache; and
storing the data received in the caching request in the dedicated allocation associated with the entity.

4. The computer-implemented method of claim 1, further comprising:
determining a plurality of hit ratios corresponding to each entity of the pluralities of entities, each hit ratio identifying a percentage of caching requests that result in requested data being found in the cache, wherein evicting the amount of data from the shared allocation of the cache is further based at least in part on the plurality of hit ratios.

5. The computer-implemented method of claim 1, further comprising:
receiving a data request for cached data associated with an entity;
determining whether the cached data is stored in the dedicated allocation associated with the entity; and
when the cached data is stored in the dedicated allocation associated with the entity, returning the cached data in response to the data request.

6. The computer-implemented method of claim 5, further comprising:
when the cached data is not stored in the dedicated allocation associated with the entity:
determining whether the cached data is stored in the shared allocation of the cache;
when the cached data is stored in the shared allocation, returning the cached data;
when the cached data is not stored in the shared allocation, returning an indication that the cached data was not found.

7. The computer-implemented method of claim 6, further comprising:
when the cached data is stored in the shared allocation:
determining whether the dedicated allocation associated with the entity is full; and
migrating the cached data to the dedicated allocation associated with the entity when the dedicated allocation associated with the entity is not full.

8. The computer-implemented method of claim 7, further comprising:
when the dedicated allocation associated with the entity is full:
determining whether the shared allocation of the cache is full;
migrating an oldest instance of data from the dedicated allocation associated with the entity to the shared allocation of the cache when the shared allocation of the cache is not full; and
storing the cached data in the dedicated allocation associated with the entity.

9. The computer-implemented method of claim 8, further comprising:
when the shared allocation of the cache is full:
evicting an amount of data from the shared allocation based on identifying the amount of data as being oldest in the shared allocation of the cache;
migrating an oldest instance of data from the dedicated allocation associated with the entity to the shared allocation of the cache; and
storing the cached data in the dedicated allocation associated with the entity.

10. A computing device, comprising:
a processor;
a cache; and
one or more memories storing executable instructions that, when executed by the processor, cause the computing device to:
provide a plurality of dedicated allocations of the cache, a dedicated allocation of the of the plurality of dedicated allocations corresponding to an entity of a plurality of entities, the cache being provided utilizing random access memory of the computing device;
provide a shared allocation of the cache, the shared allocation being available for storage to each of the plurality of entities;
receive, from another computing device associated with the entity, a caching request comprising data to be cached; and
when the shared allocation of the cache is full:
evict an amount of data from the shared allocation of the cache based on identifying the amount of data as being oldest in the shared allocation of the cache;
migrate an oldest instance of data from the dedicated allocation corresponding to the entity to the shared allocation of the cache; and
store the data received in the caching request in the dedicated allocation corresponding to the entity.

11. The computing device of claim 10, wherein executing the instructions further cause the computing device to:
identify a hit ratio threshold specifying an amount of data requests that are to result in data being found in the cache;
monitor corresponding hit ratios of data requests submitted by the plurality of entities; and
provide a notification to an entity when a hit ratio associated with the entity falls below the hit ratio threshold.

12. The computing device of claim 10, wherein the amount of data of the shared allocation of the cache is evicted further based at least in part on identifying first data corresponding to an entity with a highest hit ratio of a plurality of hit ratios corresponding to the plurality of entities.

13. The computing device of claim 10, wherein executing the instructions further cause the computing device to:
store the data in a dedicated allocation associated with the entity when the dedicated allocation corresponding to the entity has available space; and
store the data in a shared allocation of the cache when the dedicated allocation corresponding to the entity is full.

14. The computing device of claim 10, wherein executing the instructions further cause the computing device to:
receive, from another computing device associated with an entity of the plurality of entities, a data request identifying data to be retrieved;
search for the data in the dedicated allocation corresponding to the entity; and
provide the data in a data response when the data is found in the dedicated allocation corresponding to the entity.

15. The computing device of claim 14, wherein executing the instructions further cause the computing device to:

search for the data in the shared allocation when the data is not found in the dedicated allocation corresponding to the entity;

provide the data in a data response when the data is found in the shared allocation; and provide a notification that the data is not found when the data is not found in the shared allocation.

16. The computing device of claim 10, wherein utilizing the plurality of dedicated allocations and the shared allocation decreases an overall latency associated with of data requests submitted by the plurality of entities.

17. The computing device of claim 10, wherein the plurality of dedicated allocations are equal in size.

18. The computing device of claim 10, wherein executing the instructions further cause the computing device to maintain a mapping identifying each of the plurality of entities to a particular corresponding dedicated allocation of the cache.

\* \* \* \* \*